(12) United States Patent
Chong et al.

(10) Patent No.: US 10,771,835 B1
(45) Date of Patent: Sep. 8, 2020

(54) CONTROLLING CONFIGURABLE LIGHTS USING COLOR METADATA OF A MEDIA STREAM

(71) Applicant: Amazon Technologies, Inc., Seattle, WA (US)

(72) Inventors: Kevin Sehan Lee Chong, Seattle, WA (US); Paul Simon Nann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 15/948,597

(22) Filed: Apr. 9, 2018

(51) Int. Cl.
*H04N 21/41* (2011.01)
*H04N 9/31* (2006.01)
*H04N 21/436* (2011.01)

(52) U.S. Cl.
CPC ....... *H04N 21/4131* (2013.01); *H04N 9/3155* (2013.01); *H04N 21/43615* (2013.01)

(58) Field of Classification Search
None
See application file for complete search history.

(56) References Cited

U.S. PATENT DOCUMENTS

| 8,156,530 | B2* | 4/2012 | Dey | H04N 21/41407 725/62 |
| 8,947,596 | B2* | 2/2015 | Schmidt | G11B 27/10 348/468 |
| 9,363,355 | B2* | 6/2016 | Ryu | H04N 21/4126 |
| 10,504,382 | B2* | 12/2019 | Oguchi | G09B 5/065 |
| 2003/0159143 | A1* | 8/2003 | Chan | H04N 5/45 725/41 |
| 2004/0244031 | A1* | 12/2004 | Martinez | H04N 7/17318 725/25 |
| 2005/0039133 | A1* | 2/2005 | Wells | G06Q 10/10 715/740 |
| 2008/0016533 | A1* | 1/2008 | Rothschild | H04N 7/17318 725/60 |
| 2009/0172724 | A1* | 7/2009 | Ergen | G06Q 30/02 725/32 |

(Continued)

*Primary Examiner* — Jefferey F Harold
*Assistant Examiner* — Mustafizur Rahman
(74) *Attorney, Agent, or Firm* — Eversheds Sutherland (US) LLP

(57) ABSTRACT

Systems, methods, and computer-readable media are disclosed for controlling configurable lights using color metadata of a media stream. In one embodiment, an example method may include sending a request for media content for presentation at a user device, the media content comprising video content, receiving a media stream comprising in-band data and out-of-band data, the in-band data comprising video content data, and the out-of-band data comprising color metadata, determining, based at least in part on the color metadata, one or more first lighting parameters for one or more configurable lights associated with an environment of the user device, the one or more first lighting parameters corresponding to a first portion of the video content, causing a presentation of the first portion of the video content at the user device, and causing, based at least in part on the one or more first lighting parameters, the one or more configurable lights to output one or more first colors during the presentation of the first portion of the video content at the user device.

20 Claims, 10 Drawing Sheets

(56) References Cited

U.S. PATENT DOCUMENTS

| | | | |
|---|---|---|---|
| 2009/0296000 A1* | 12/2009 | Pal | H04N 7/165 348/725 |
| 2010/0039530 A1* | 2/2010 | Guo | H04N 5/2351 348/231.99 |
| 2011/0066943 A1* | 3/2011 | Brillon | G07F 17/305 715/716 |
| 2012/0050012 A1* | 3/2012 | Alsina | H04N 21/8455 340/10.1 |
| 2012/0229702 A1* | 9/2012 | Karaoguz | G09G 3/2096 348/441 |
| 2012/0291060 A1* | 11/2012 | Relyea | H04N 21/4126 725/25 |
| 2014/0149918 A1* | 5/2014 | Asokan | G06Q 30/0255 715/783 |
| 2014/0375752 A1* | 12/2014 | Shoemake | G06F 3/011 348/14.07 |
| 2015/0049201 A1* | 2/2015 | Liu | H04N 17/00 348/189 |
| 2015/0356355 A1* | 12/2015 | Oguchi | G06F 16/7837 386/230 |
| 2015/0373281 A1* | 12/2015 | White | G06F 16/435 348/660 |
| 2018/0095656 A1* | 4/2018 | Ingah | G06F 3/04883 |
| 2018/0167670 A1* | 6/2018 | Sprenger | H04W 76/10 |

\* cited by examiner

| TIME | FIRST REGION | SECOND REGION | THIRD REGION | FOURTH REGION |
|---|---|---|---|---|
| ... | ... | ... | ... | ... |
| 00:00:30.000 | BLUE | GREEN | GREEN | GREEN |
| 00:02:10.042 | WHITE | GREEN | RED | BLUE |
| ... | ... | ... | ... | ... |
| 00:03:42.126 | WHITE | GREEN | BLUE | BLUE |
| 00:04:21.542 | YELLOW | BLUE | BLUE | BLUE |
| ... | ... | ... | ... | ... |

FIG. 1C

| TIME | FIRST LIGHT | SECOND LIGHT | THIRD LIGHT | FOURTH LIGHT | FIFTH LIGHT | SIXTH LIGHT | SEVENTH LIGHT | EIGHTH LIGHT |
|---|---|---|---|---|---|---|---|---|
| ... | ⌒182a | ⌒182b | ⌒182c | ⌒182d | ⌒182e | ⌒182f | ⌒182g | ⌒182h |
| 00:00:30.000 | BLUE | GREEN | GREEN | GREEN | BLUE | BLUE | GREEN | GREEN |
| 00:02:10.000 | WHITE | GREEN | RED | BLUE | WHITE | WHITE | GREEN | GREEN |
|  | ⌒184a | ⌒184b | ⌒184c | ⌒184d | ⌒184e | ⌒184f | ⌒184g | ⌒184h |
| 00:03:42.126 | WHITE | GREEN | BLUE | BLUE | WHITE | WHITE | GREEN | GREEN |
| 00:04:21.542 | YELLOW | BLUE | BLUE | BLUE | YELLOW | YELLOW | BLUE | BLUE |
| ... | ... | ... | ... | ... | ... | ... | ... | ... |

FIG. 1D

CONTROLLING CONFIGURABLE LIGHTS USING COLOR METADATA OF A MEDIA STREAM

BACKGROUND

Electronic user devices may be used to consume different types of media content, such as video content, audio content, or a combination of video and audio content. Various features have been developed to enhance the visual experience for users consuming such content via electronic devices. For example, bias lighting systems or ambient lighting systems may be provided as a part of or used in conjunction with certain electronic devices to improve a user's viewing experience. In certain instances, such lighting systems may be adjusted to complement video content that is presented at a display screen of the device or audio content that is output by speakers associated with the device. However, in the context of media content that is being streamed to an electronic user device, it may be difficult to control additional lighting systems in a manner that complements the media content presented at the user device.

BRIEF DESCRIPTION OF THE DRAWINGS

FIG. 1C schematically depicts example color metadata of a media stream in accordance with one or more embodiments of the disclosure.

FIG. 1D schematically depicts example lighting color parameters for configurable lights in accordance with one or more embodiments of the disclosure.

Figure 1A:
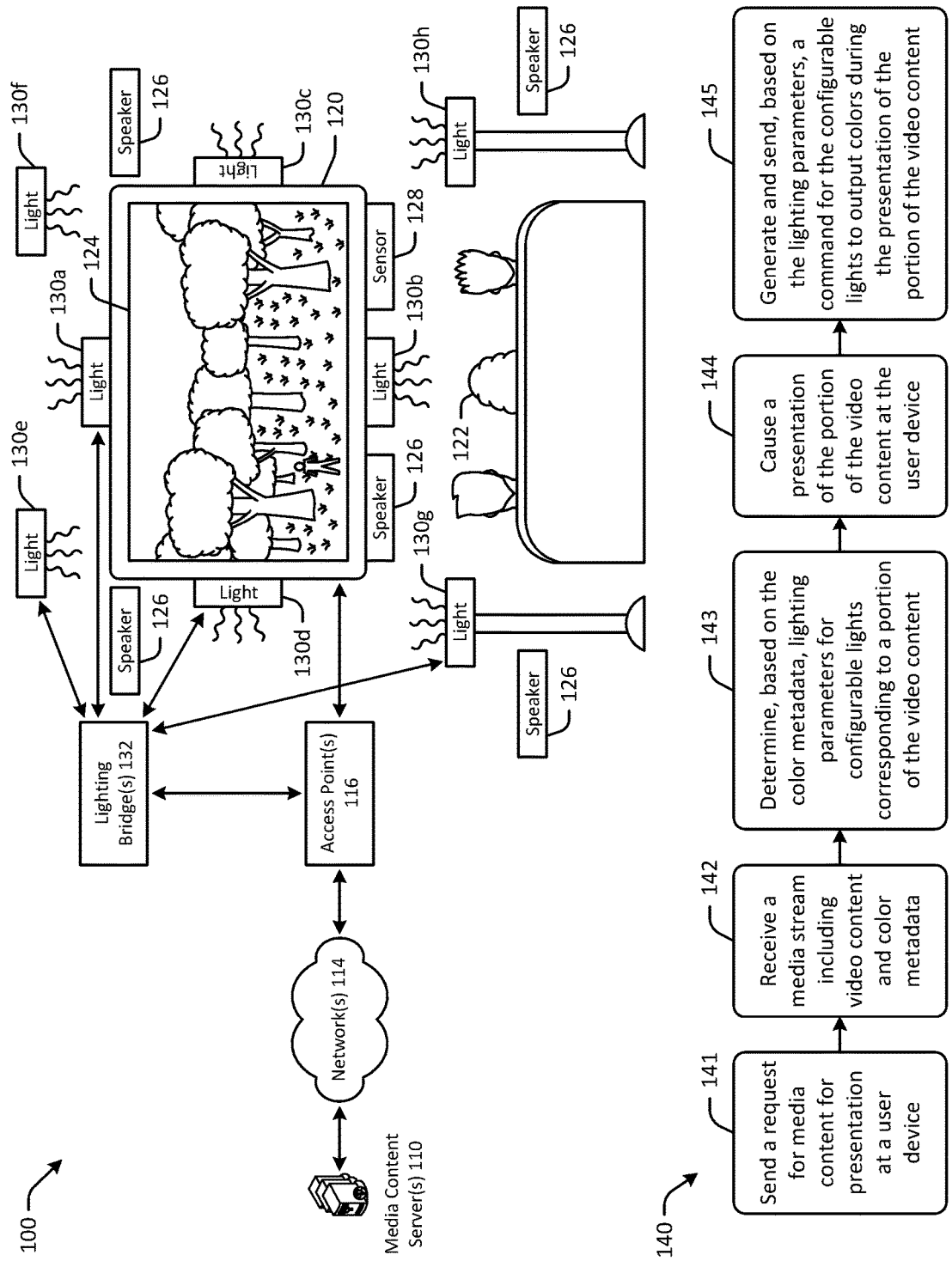
FIG. 1A is a hybrid system and process diagram illustrating controlling configurable lights using color metadata of a media stream in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

A variety of media content may be presented at electronic user devices, such that users may consume the media content. For example, movies, TV shows, music, music videos, or other types of content may be presented at electronic devices and consumed by users. Media content may include video content for visual consumption, audio content for auditory consumption, or a combination of video content and audio content. In recent years, various improvements have been developed to enhance the visual experience for users consuming media content via electronic user devices. For example, increases in display screen size have allowed users to enjoy a more cinema-like experience in a home environment, and increases in display resolution have provided improved picture quality for video content presented at electronic user devices. Further, in some instances, additional lighting systems may be used in an effort to improve the viewing experience for users consuming media content. For example, certain existing electronic devices may include or be used in conjunction with bias lighting systems or ambient lighting systems that output light in an area around the electronic device. In some instances, the light output by such lighting systems may be adjusted, either manually by a user or automatically by the electronic device, to complement video content that is presented at a display screen of the electronic device or audio content that is output by speakers of the device or associated therewith. In this manner, such additional lighting systems may provide a more immersive viewing experience, for example, by causing the environment surrounding the electronic device to match or otherwise complement a scene depicted on the display screen of the device.

In some instances, existing electronic user devices may be able to analyze media content that is presented at the device and automatically adjust settings of an additional lighting system such that light that is output by the lighting system complements the media content throughout the presentation. For example, certain existing electronic user devices may be configured to identify video content being presented at a display screen of the device, analyze the video content to determine colors, brightness, or other properties of the video content, and dynamically control an additional lighting system to output light that matches the scene depicted on the display screen. As a result, the electronic device may extend the viewing experience into the environment surrounding the device, allowing a user to become more immersed in the presented content. This approach, however, may not be feasible in instances in which the media content is streamed to an electronic device from a remote content server. A particular problem may arise when the streamed media content provided to the electronic device is encrypted. For example, in certain instances, a digital rights management (DRM) protocol, such as high-bandwidth digital content protection (HDCP), may be used to prevent copying of digital media content as the content travels across connections. As a result, although the electronic device may be able to present the media content for consumption by users, the device may not be able to access and analyze the underlying video content or audio content. For example, the electronic device may be unable to access and analyze image frames of the video content to determine colors, brightness, or other properties of the content presented at the display screen.

Embodiments of the disclosure may provide an enhanced viewing experience for users consuming media content that is streamed to an electronic user device by controlling configurable lights using color metadata of a media stream. Certain embodiments may send a request for media content for presentation at a user device. The media content may include video content and audio content, and the request may indicate that the media content is to be streamed to the user device from a remote media content server. Some embodiments may receive a media stream that includes encrypted in-band data and unencrypted out-of-band data. For example, the encrypted in-band data and the unencrypted out-of-band data may be delivered to the user device in respective packets of the media stream. The encrypted in-band data may include video content data and audio content data, and the unencrypted out-of-band data may include color metadata. The color metadata may be generated by the media content server by analyzing respective image frames of the video content, or the media content server may retrieve color metadata previously generated by a creator of the video content. Certain embodiments may determine, based at least in part on the color metadata, first lighting color parameters for a plurality of configurable lights associated with an environment of the user device. The first lighting color parameters may correspond to a first portion of the video content and may be determined using a respective portion of the color metadata corresponding to the first portion of the video content. Some embodiments may cause a presentation of the first portion of the video content at the user device. For example, a video player of the user device may cause the first portion of the video content to be presented at a display screen of the user device. Certain embodiments may send, based at least in part on the first lighting color parameters, a first command for the plurality of configurable lights to output a first color or plurality of colors during the presentation of the first portion of the video content at the user device. For example, the first command may be sent by the user device to an access point, routed by the access point to a lighting bridge, and relayed by the lighting bridge to the plurality of configurable lights. Alternatively, the first command may be sent by the user device directly to the lighting bridge or directly to the plurality of configurable lights. Upon receiving the first command, the plurality of configurable lights may output the first color or plurality of colors during the presentation of the first portion of the video content at the user device.

In a similar manner, certain embodiments may determine, based at least in part on the color metadata, second lighting color parameters for the plurality of configurable lights. The second lighting color parameters may correspond to a second portion of the video content and may be determined using a respective portion of the color metadata corresponding to the second portion of the video content. Some embodiments may cause a presentation of the second portion of the video content at the user device after the presentation of the first portion of the video content at the user device. For example, the video player of the user device may cause the second portion of the video content to be presented at the display screen of the user device after the presentation of the first portion of the video content. Certain embodiments may send, based at least in part on the second lighting color parameters, a second command for the plurality of configurable lights to output a second color or plurality of colors during the presentation of the second portion of the video content at the user device. For example, the second command may be sent by the user device to an access point, routed by the access point to a lighting bridge, and relayed by the lighting bridge to the plurality of configurable lights. Alternatively, the second command may be sent by the user device directly to the lighting bridge or directly to the plurality of configurable lights. Upon receiving the second command, the plurality of configurable lights may output the second color or plurality of colors during the presentation of the second portion of the video content at the user device. The second color or plurality of colors may be different from the first color or plurality of colors. In this manner, the one or more colors output by the plurality of configurable lights during the presentation of the second portion of the video content may be different from the respective one or more colors output by the plurality of configurable lights during the presentation of the first portion of the video content.

As a result, embodiments of the disclosure may provide an enhanced viewing experience for users consuming streamed media content at a user device. As compared to approaches by which a user device accesses and analyzes image frames of video content to determine corresponding settings for additional lighting systems, embodiments of the disclosure may allow a user device to determine lighting color parameters for a plurality of configurable lights without having to access or analyze image frames of video content at the user device. For example, by receiving color metadata as a part of out-of-band data of a media stream received from a content media server, a user device may access the color metadata and use such metadata to determine respective lighting color parameters for different portions of the video content. The respective lighting color parameters then may be used to control the plurality of configurable lights throughout a presentation of the video content at the user device. For example, respective colors of the lights output by the plurality of configurable lights may be changed from one portion of the video content to another portion of the video content to create a more immersive visual experience for users consuming the video content. Ultimately, embodiments of the disclosure may overcome the relative difficulty in adjusting configurable lights to complement media content presented at a user device when the media content is streamed to the user device in an encrypted format.

This disclosure relates to, among other things, systems, methods, computer-readable media, techniques, and methodologies for controlling configurable lights using color metadata of a media stream. Embodiments may send a request for media content for presentation at a user device. The media content may include video content, and the request may indicate that the media content is to be streamed to the user device from a remote media content server. Embodiments may receive a media stream that includes in-band data and out-of-band data. The in-band data may include video content data, and the out-of-band data may include color metadata. Embodiments may determine, based at least in part on the color metadata, respective sets of lighting color parameters for configurable lights associated with an environment of the user device, with the sets of lighting color parameters corresponding to respective portions of the video content. Embodiments may cause a presentation of a portion of the video content at the user device. Embodiments may cause, based at least in part on the respective set of lighting parameters, the configurable lights to output one or more colors during the presentation of the portion of the video content at the user device.

Referring to FIG. 1A, an example system 100 illustrating controlling configurable lights using color metadata of a media stream is depicted. The system 100 may include one or more servers and at least one or a plurality of user devices that connects to the server. In the example of FIG. 1A, one or more media content server(s) 110 may be in communication with one or more user devices. Communication between the media content server 110 and the one or more user devices may be facilitated by one or more networks. The one or more user devices may connect to or communicate with the media content server 110, on a regular or irregular basis, to receive content from or deliver content to the media content server 110. The one or more user devices may be any type of electronic device used by a user to communicate with the media content server 110.

In the example of FIG. 1A, the media content server 110 may be in communication with a user device 120 associated with one or more user(s) 122. The user device 120 may be one or more of a television, a set-top box, a computing device, a mobile phone, or an external computing device coupled to a television. For example, the user device 120 may be an external computing device coupled to a television via a wired or wireless connection. Communication between the media content server 110 may be facilitated by one or more network(s) 114 and one or more access point(s) 116. The media content server 110 may be in communication with and deliver content to or receive content from any number of user devices associated with any number of users. In the example of FIG. 1A, the user device 120 may send a request for media content to the media content server 110, and the media content server 110 may send a media stream to the user device 120 in response to the request for media content. The media content may include video content, audio content, or a combination of video content and audio content. For example, the media content may be a movie that includes both video content and audio content. The user device 120 may send the request for media content in response to the user 122 interacting with the user device 120. For example, the user 122 may interact with a television or an external computing device of the user device 120 to initiate the request for media content. The media content server 110 may identify the requested media content and stream the media content to the user device 120 via the network 114. In some instances, the media stream may include a series of packets sent to the user device 120, allowing the user device 120 to begin presenting the media content prior to receiving the entirety of the media content. In other instances, the media stream may include a set of links that can be used by the user device 120 to download respective portions of the media content. For example, a manifest file or seed file including the set of links may be provided to the user device 120. As described below, the media stream may include in-band data and out-of-band data. In some embodiments, the in-band data may be encrypted (e.g., for example, in connection with digital rights management (DRM)), and the out-of-band data may be unencrypted. This encryption is not to be confused with encryption that may be performed on the streaming data for secure communication over a network (for example, the Internet), as commonly provided in the transport layer via, for example, HTTPS.

In some embodiments, the in-band data may include video content data, audio content data, or both video content data and audio content data. The user device 120 may use the video content data and/or the audio content data to facilitate presentation of the media content at the user device 120 for consumption by the user 122. In some embodiments, the out-of-band data may include color metadata. As described below, the user device 120 may use the color metadata to facilitate controlling one or more configurable lights associated with an environment of the user device 120. In some aspects, the environment may be a home environment, such as a room in which the user device 120 is located. In some embodiments, the media content data and the color metadata may be provided to the user device 120 from a content source other than the media content server 110. For example, a local content source, such as a Blu-ray player, or other content source in communication with the user device 120 may provide the media content data and the color metadata to the user device 120.

As depicted in FIG. 1A, the user device 120 may include a display screen 124 configured to present video content. For example, video content of the media content received from the media content server 110 may be presented at the display screen 124 for visual consumption by the user 122. One or more speaker(s) 126 configured to output audio content also may be provided in the user environment. For example, audio content of the media content received from the media content server 110 may be output by the speakers 126. In some embodiments, one or more of the speakers 126 may be provided as an integral component of the user device 120. In some embodiments, one or more of the speakers 126 may be separate from the user device 120 but in communication with and associated with the user device 120. One or more sensor(s) 128 (referred to as sensor 128) also may be provided in the user environment. In some embodiments, the sensor 128 may be a light sensor configured to detect an amount or level of light present in the user environment. For example, the sensor 128 may be configured to detect an amount or level of ambient light in the user environment, which may be sunlight or other light coming into the user environment from outside the user environment, and/or output by lights in the user environment that are not associated with the user device 120. In some embodiments, the sensor 128 may be provided as a part of the user device 120. In some embodiments, sensor 128 may be separate from the user device 120 but in communication with and associated with the user device 120.

The system 100 also may include one or more configurable lights 130 associated with the user environment. The configurable lights 130 may be configured to output light in the user environment. As described below, one or more parameters of the light output by the configurable lights 130 may be controlled to complement the media content presented at the user device 120. In the example of FIG. 1A, a plurality of configurable lights 130 may be provided. For example, the system 100 may include a first configurable light 130*a*, a second configurable light 130*b*, a third configurable light 130*c*, a fourth configurable light 130*d*, a fifth configurable light 130*e*, a sixth configurable light 130*f*, a seventh configurable light 130*g*, and an eighth configurable light 130*h*. In some embodiments, one or more of the configurable lights 130 may be provided as an integral component of the user device 120 or otherwise mounted to the user device 120. For example, the first configurable light 130*a* may be mounted along the top of the user device 120 and configured to output light upward and/or backward relative to the user device 120, the second configurable light 130*b* may be mounted along the bottom of the user device 120 and configured to output light downward and/or backward relative to the user device 120, a third configurable light 130*c* may be mounted along the right side of the user device 120 and configured to output light rightward and/or backward relative to the user device 120, and the fourth configurable light 130*d* may be mounted along the left side of the user device 120 and configured to output light leftward and/or backward relative to the user device 120. In some embodiments, one or more of the configurable lights 130 may be separate from but associated with the user device 120. In this manner, such configurable lights 130 may be positioned within the user environment at various locations relative to the user device 120. For example, the fifth configurable light 130*e* and the sixth configurable light 130*f* may be mounted to a ceiling or a wall of the user environment above the user device 120 and configured to output light downward. Further, the seventh configurable light 130*g* and the eighth configurable light 130*h* may be provided as freestanding lights positioned behind and/or to the sides of the user 122 within the user environment. It will be appreciated that the relative positions of the configurable lights 130 depicted in FIG. 1A is merely one example configuration and that other configurations of the configurable lights 130 may be used.

In the example of FIG. 1A, communication between the user device 120 and the configurable lights 130 may be facilitated by one or more lighting bridge(s) 132. In some embodiments, the lighting bridge 132 may be a smart home hub, integrated into a smart home hub, or coupled to a smart home hub. The lighting bridge 132 may be in communication with the configurable lights via one or more wired or wireless connections. For example, the lighting bridge 132 and the configurable lights 130 may communicate with one another via WiFi, Bluetooth, ZigBee, or another type of wireless protocol. In some embodiments, the lighting bridge 132 and the configurable lights 130 may communicate via a hub-and-spoke arrangement in which respective communication signals may be sent between the lighting bridge 132 and each of the configurable lights 130. In some embodiments, the lighting bridge 132 and the configurable lights 130 may communicate via a chained (or mesh) arrangement in which respective communication signals may be sent between the lighting bridge 132 and one or more of the configurable lights 130 via intermediate configurable lights 130. In the example of FIG. 1A, the lighting bridge 132 may be in communication with the user device 120 via the access point 116. In this manner, the communication signals between the lighting bridge 132 and the user device 120 may be routed by the access point 116. In some embodiments, the user device 120 may communicate directly with the lighting bridge 132 via one or more wireless protocols. In some embodiments, the user device 120 may communicate directly with the configurable lights 130 via one or more wireless protocols.

To present streamed media content at the user device 120 and control the configurable lights 130 during the presentation of the media content, the user device 120 may execute one or more process flows. For example, an example process flow 140 for controlling configurable lights using color metadata of a media stream is depicted in FIG. 1A.

At block 141 of the process flow 140, the user device 120 may send a request for media content for presentation at the user device 120. For example, the user device 120 may send a request for media content for presentation at the user device 120 in response to the user 122 interacting with the user device 120. The media content may include video content, audio content, or both video content and audio content. The request for media content may be sent to the media content server 110 via the access point 116 and the network 114, and the request may indicate that the media content is to be streamed to the user device 120.

At block 142 of the process flow 140, the user device 120 may receive a media stream that includes in-band data and out-of-band data. For example, the user device 120 may receive the media stream from the media content server 110 in response to the media content server 110 receiving and processing the request for media content. In some embodiments, the in-band data may be encrypted (e.g., for example, in connection with digital rights management (DRM)), and the out-of-band data may be unencrypted. The in-band data may include video content data, audio content data, or both video content data and audio content data. The out-of-band data may include color metadata corresponding to the in-band data of the media stream. In some embodiments, the color metadata may be provided as text data, which may be sent to the user device as a single text file corresponding to the entirety of the media content or as a set of text files each corresponding to a respective portion of the media content. In some embodiments, the color metadata may be provided as pixel data, which may be sent to the user device as a single file corresponding to the entirety of the media content or as a set of files each corresponding to a respective portion of the media content. In some embodiments, the color metadata may be generated by the media content server 110 by analyzing respective image frames of the video content, as described below with respect to FIG. 1B. In some embodiments, the color metadata may be generated by the media content server 110 by analyzing respective features of the audio content. In some embodiments, the color metadata may have been previously generated by a creator of the media content and associated with the media content, and the media content server 110 may retrieve the color metadata from a database accessible to the media content server 110. In some embodiments, the color metadata may include a plurality of entries corresponding to respective elapsed times of the media content. Each entry of the color metadata may include a time value corresponding to the respective elapsed time of the media content, and one or more color values associated with the time value, as described below with respect to FIG. 1C. In some embodiments, the one or more color values may correspond to one or more colors depicted in one or more regions of the video content at the respective elapsed time of the media content. In some embodiments, the one or more color values may correspond to one or more visual effects that complement a scene or action depicted in the video content at the respective elapsed time of the media content. For example, the one or more color values may correspond to a flash of light of movement of light that complements a scene of the video content depicting a gun shot, an explosion, fireworks, lightning, or movement of an object. In such embodiments, the corresponding portions of the color metadata may be generated by a creator of the media content to create the desired visual effect. In some embodiments, the one or more color values may correspond to one or more auditory aspects or features of the audio content at the respective elapsed time of the media content. For example, the one or more color values may correspond to respective beats, beat patterns, frequencies, or instrumental compositions of respective portions of the audio content.

At block 143 of the process flow 140, the user device 120 may determine, based at least in part on the color metadata, a set of lighting parameters for configurable lights corresponding to a portion of the video content. For example, a lighting control module of the user device 120 may use the color metadata of the media stream to determine a set of lighting parameters for the configurable lights 130, with the set of lighting parameters corresponding to a particular portion of the video content. In some embodiments, the user device 120 may determine, based at least in part on the color metadata, respective sets of lighting parameters for the configurable lights 130, with each set of lighting parameters corresponding to a different portion of the video content. In some embodiments, the user device 120 may determine, based at least in part on the color metadata, respective sets of lighting parameters for the configurable lights 130, with each set of lighting parameters corresponding to a different portion of the audio content. In some embodiments, a lighting parameter may be indicative of a color to be output by one or more of the configurable lights 130 during a presentation of the respective portion of the video content or the audio content, as described below with respect to FIG. 1D. In some embodiments, a lighting parameter may be indicative of a brightness of light, or other attributes of light, to be output by one or more of the configurable lights 130 during a presentation of the respective portion of the video content or the audio content. In some embodiments, the user device 120 may determine a set of lighting parameters based at least in part on the color metadata and a lighting setup corresponding to a configuration of the configurable lights 130 in the user environment. The lighting setup may include relative positions of the configurable lights 130 with respect to the display screen 124 of the user device 120. For example, the lighting setup may indicate that the first configurable light 130a, the fifth configurable light 130e, and the sixth configurable light 130f are positioned above the display screen 124, that the second configurable light 130b, the seventh configurable light 130g, and the eighth configurable light 130h are positioned below the display screen 124, that the third configurable light 130c is positioned to the right of the display screen 124, and that the fourth configurable light 130d is positioned to the left of the display screen 124. In this manner, in determining a set of lighting parameters, the user device 120 may use the lighting setup to associate each of the configurable lights 130 with a particular region of the video content. In some embodiments, the lighting setup may be input by the user 122 during an initial setup process to establish the relative positions of the configurable lights 130 with respect to the display screen 124. In some embodiments, the user device 120 may determine a set of lighting parameters based at least in part on the color metadata and a user profile associated with the user device 120. The user profile may include one or more settings corresponding to user preferences as to how the configurable lights 130 may be controlled during a presentation of video content or audio content. For example, settings of the user profile may indicate user preferences related to a brightness of color to be output by the configurable lights 130, a range of colors to be output by the configurable lights 130, or whether or not one or more of the configurable lights 130 may be used to output color during the presentation of certain types of media content.

At block 144 of the process flow 140, the user device 120 may cause a presentation of the portion of the video content at the user device 120. For example, a media content module of the user device 120 may cause, based at least in part on the video content data, the respective portion of the video content to be presented at the display screen 124 of the user device 120. In some embodiments, the user device 120 also may cause an output of the corresponding portion of the audio content. For example, the media content module of the user device 120 may cause, based at least in part on the audio content data, the corresponding portion of the audio content to be output by the speakers 126.

At block 145 of the process flow 140, the user device 120 may generate and send, based at least in part on the set of lighting parameters, a command for the configurable lights to output colors during the presentation of the portion of the video content. For example, a lighting control module of the user device 120 may generate and send, based at least in part on the respective set of lighting parameters and using one or more application programming interfaces (APIs), a command for the configurable lights 130 to output one or more colors during the presentation of the respective portion of the video content. In some embodiments, the command may be sent by the user device 120 to the access point 116, routed by the access point 116 to the lighting bridge 132, and relayed by the lighting bridge 132 to the configurable lights 130. In some embodiments, the command may be sent by the user device 120 directly to the lighting bridge 132 and relayed by the lighting bridge 132 to the configurable lights 130. In some embodiments, the command may be sent by the user device 120 directly to the configurable lights 130. Upon receiving the command, the configurable lights 130 may output the respective one or more colors during the presentation of the respective portion of the video content at the user device 120. The user device 120 may generate the command prior to the presentation of the portion of the video content. Further, the user device 120 may send the command prior to the presentation of the portion of the video content, such that the configurable lights 130 begin to output the one or more colors at the beginning of the presentation of the portion of the video content. In some embodiments, the user device 120 may determine a timing of delivery of the command based at least in part on a calibration setup corresponding to a delay between the user device 120 sending a command and the configurable lights 130 outputting light based on that command. For example, the calibration setup may include respective latency values for the configurable lights 130. In some embodiments, the calibration setup may be manually generated by the user 122 during an initial setup process to establish the respective latency values for the configurable lights 130. In some embodiments, the calibration setup may automatically generated by a calibration tool during an initial setup process to establish the respective latency values for the configurable lights.

Figure 1B:
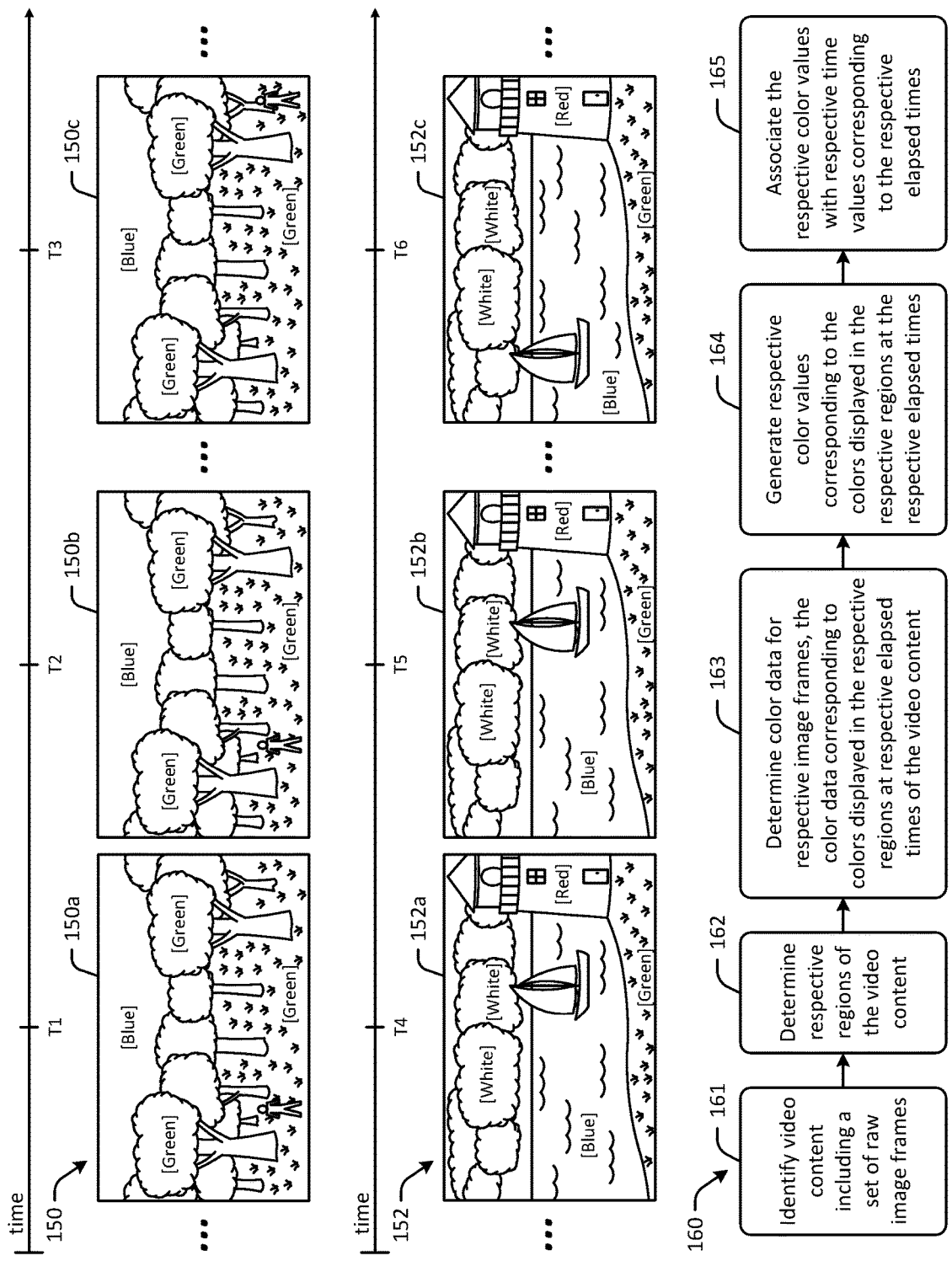
FIG. 1B is a hybrid system and process diagram illustrating generating color metadata of a media stream using image frames of video content in accordance with one or more embodiments of the disclosure.

As explained above, in some instances, the color metadata for the media content may be generated by analyzing respective image frames of the video content. FIG. 1B depicts a first set of image frames 150 corresponding to a first portion of the video content and a second set of image frames 152 corresponding to a subsequent second portion of the video content. In some embodiments, the first portion of the video content may be a first scene of the video content, and the second portion of the video content may be a subsequent second scene of the video content. Each image frame may correspond to a respective elapsed time of the video content. In some embodiments, the video content may include a plurality of image frames per second of the video content. For example, the video content may include twenty-four (24) image frames per second of the video content. In the example of FIG. 1B, the first set of image frames 150 may include a first image frame 150a corresponding to a first elapsed time T1, a second image frame 150b corresponding to a second elapsed time T2, and a third image frame 150c corresponding to a third elapsed time T3. For example, the first elapsed time T1 may be thirty (30) seconds, the second elapsed time T2 may be thirty (30) seconds and forty-two (42) milliseconds, and the third elapsed time T3 may be two (2) minutes and ten (10) seconds. In this manner, the first image frame 150a and the second image frame 150b may be consecutive image frames of the first set of image frames 150, and the first set of image frames 150 may include additional image frames corresponding to respective elapsed times between the second elapsed time T2 and the third elapsed time T3. In the example of FIG. 1B, the second set of image frames 152 may include a fourth image frame 152a corresponding to a fourth elapsed time T4, a fifth image frame 152b corresponding to a fifth elapsed time T5, and a sixth image frame 152c corresponding to a sixth elapsed time T6. For example, the fourth elapsed time T4 may be two (2) minutes, ten (10) seconds, and forty-two (42) milliseconds, the fifth elapsed time T5 may be two (2) minutes, ten (10) seconds (30), and eighty-four (84) milliseconds, and the sixth elapsed time T6 may be three (3) minutes and twelve (12) seconds. In this manner, the fourth image frame 152a and the fifth image frame 152b may be consecutive image frames of the second set of image frames 152, and the second set of image frames 152 may include additional image frames corresponding to respective elapsed times between the fifth elapsed time T5 and the sixth elapsed time T6. Further, in the example of FIG. 1B, the third image frame 150c and the fourth image frame 152a may be consecutive image frames of the video content.

To generate the color metadata for the media content, the media content server 110 may execute one or more process flows. For example, an example process flow 160 for generating color metadata using image frames of video content is depicted in FIG. 1B. The process flow 160 may be executed by the media content server 110 prior to encoding and packaging of the media content for streaming to user devices. In this manner, the media content server 110 may access the raw image frames of the video content and use the raw image frames to generate the color metadata. In some embodiments, the process flow 160 may be executed by the media content server 110 prior to receiving a request for the media content from a user device.

At block 161 of the process flow 160, the media content server 110 may identify video content for presentation at a user device. For example, a metadata generation module of the media content server 110 may identify video content for presentation at the user device 120. The video content may include one or more sets of raw image frames. For example, the video content may include the first set of image frames 150 and the second set of image frames 152.

At block 162 of the process flow 160, the media content server 110 may determine one or more regions of the video content. In some embodiments, the video content may include a plurality of regions corresponding to respective portions of a display screen at which the video content may be presented and to the corresponding portions of the respective image frames of the video content. For example, the video content may include a first region corresponding to a top portion of a display screen, a second region corresponding to a bottom portion of a display screen, a third region corresponding to a right-side portion of a display screen, and a fourth region corresponding to a left-side region of a display screen. In some embodiments, two or more of the regions of the video content may overlap one another. For example, the first region may overlap respective portions of the third region and the fourth region. In some embodiments, the regions of the video content may be non-overlapping and distinct from one another. Any number of regions of the video content may be used. In some embodiments, a single region may be used, which may correspond to the entirety of a display screen or only a portion of the display screen.

At block 163 of the process flow 160, the media content server 110 may determine color data for the respective image frames of the video content. For example, the metadata generation module of the media content server 110 may analyze each image frame of the video content to determine color data for the particular image frame. The color data may correspond to one or more colors displayed in the respective regions of the video content at the respective elapsed time of the video content. For example, the media content server 110 may analyze the first image frame 150a to determine first color data corresponding to one or more colors displayed in the respective regions of the video content at the first elapsed time T1. Further, the media content server 110 may analyze the fourth image frame 152a to determine second color data corresponding to one or more colors displayed in the respective regions of the video content at the fourth elapsed time T4. In some embodiments, the media content server 110 may analyze each image frame on a pixel-by-pixel basis to determine a respective color displayed at each pixel.

At block 164 of the process flow 160, the media content server 110 may generate respective color values corresponding to the colors displayed in the respective regions of the video content at the respective elapsed times of the video content. For example, the metadata generation module of the media content server 110 may use the color data for each image frame to generate respective color values for the respective regions of the video content at the respective elapsed time of the video content. In some embodiments, each color value may correspond to an average color of the one or more colors displayed within a particular region of the video content at a particular elapsed time. In some embodiments, a color value may correspond to a dominant color of the one or more colors displayed within a particular region of the video content at a particular elapsed time. According to the illustrated example, the media content server 110 may use the first color data determined using the first image frame 150a to generate a first set of four color values corresponding to the respective regions of the video content at the first elapsed time T1. For example, the media content server 110 may generate a first color value of "blue" corresponding to the first region of the video content at the first elapsed time T1, a second color value of "green" corresponding to the second region of the video content at the first elapsed time T1, a third color value of "green" corresponding to the third region of the video content at the first elapsed time T1, and a fourth color value of "green" corresponding to the fourth region of the video content at the first elapsed time T1. In a similar manner, the media content server 110 may use the second color data determined using the fourth image frame 152a to generate a second set of four color values corresponding to the respective regions of the video content at the fourth elapsed time T4. For example, the media content server 110 may generate a first color value of "white" corresponding to the first region of the video content at the fourth elapsed time T4, a second color value of "green" corresponding to the second region of the video content at the fourth elapsed time T4, a third color value of "red" corresponding to the third region of the video content at the fourth elapsed time T4, and a fourth color value of "blue" corresponding to the fourth region of the video content at the fourth elapsed time T4.

At block 165 of the process flow 160, the media content server 110 may associate the respective sets of color values with respective time values corresponding to the respective elapsed times of the video content. For example, the first set of color values ("blue," "green," "green," and "green") may be associated with a first time value of thirty (30) seconds corresponding to the first elapsed time T1, and the second set of color values ("white," "green," "red," and "blue") may be associated with a second time value of two (2) minutes, ten (10) seconds, and forty-two (42) milliseconds corresponding to the fourth elapsed time T4.

FIG. 1C schematically depicts example color metadata 170 as may be generated and stored by the media content server 110. Although the color metadata 170 may be depicted in a table format, other types of data structures may be used to store the color metadata 170. The color metadata 170 may include a plurality of entries, with each entry including a time value and one or more color values. In the example of FIG. 1C, the color metadata 170 may include a first entry 172 and a second entry 174. The first entry 172 may correspond to the first portion of the video content, and the second entry 174 may correspond to the second portion of the video content. In this manner, the first entry 172 may include the first time value 172a of thirty (30) seconds, the first color value 172b of "blue" for the first region of the video content, the second color value 172c of "green" for the second region of the video content, the third color value 172d of "green" for the third region of the video content, and the fourth color value 172e of "green" for the fourth region of the video content. In a similar manner, the second entry 174 may include the second time value 174a of two (2) minutes, ten (10) seconds, and forty-two (42) milliseconds, the first color value 174b of "white" for the first region of the video content, the second color value 174c of "green" for the second region of the video content, the third color value 174d of "red" for the third region of the video content, and the fourth color value 174e of "blue" for the fourth region of the video content. The color metadata 170 may be stored at a database of the media content server 110 or otherwise accessible to the media content server 110. In some embodiments, the color metadata 170 may be stored as text data, pixel data, or other data formats.

FIG. 1D schematically depicts example lighting color parameters 180 as may be determined by the user device 120 using the color metadata 170 for the video content. As explained above, the user device 120 may determine respective sets of lighting color parameters corresponding to respective portions of the video content. Each set of lighting color parameters may include respective color parameters for the configurable lights 130, with each color parameter being indicative of a color to be output by the respective configurable light 130. As explained above, in determining the lighting color parameters, the user device 120 may use the lighting setup indicating the relative positions of the configurable lights 130 with respect to the display screen 124 of the user device 120. In this manner, the user device 120 may use the lighting setup to determine the respective regions of the video content associated with the respective configurable lights 130 and may use the color metadata 170 to determine the respective color parameters for the configurable lights 130 based on such associations. In the example of FIG. 1D, the lighting color parameters 180 may include a first set of lighting color parameters 182 and a second set of lighting color parameters 184. The first set of lighting color parameters 182 may correspond to the first portion of the video content and may be determined using the first entry 172 of the color metadata 170. In the example of FIG. 1D, the first set of lighting color parameters 182 may include a first color parameter 182a of "blue" associated with the first configurable light 130a, a second color parameter 182b of "green" associated with the second configurable light 130b, a third color parameter 182c of "green" associated with the third configurable light 130c, a fourth color parameter 182d of "green" associated with the fourth configurable light 130d, a fifth color parameter 182e of "blue" associated with the fifth configurable light 130e, a sixth color parameter 182f of "blue" associated with the sixth configurable light 130f, a seventh color parameter 182g of "green" associated with the seventh configurable light 130g, and an eighth color parameter 182h of "green" associated with the eighth configurable light 130h. The second set of lighting color parameters 184 may correspond to the second portion of the video content and may be determined using the second entry 174 of the color metadata 170. In the example of FIG. 1D, the second set of lighting color parameters 184 may include a first color parameter 184a of "white" associated with the first configurable light 130a, a second color parameter 184b of "green" associated with the second configurable light 130b, a third color parameter 184c of "red" associated with the third configurable light 130c, a fourth color parameter 184d of "blue" associated with the fourth configurable light 130d, a fifth color parameter 184e of "white" associated with the fifth configurable light 130e, a sixth color parameter 184f of "white" associated with the sixth configurable light 130f, a seventh color parameter 184g of "green" associated with the seventh configurable light 130g, and an eighth color parameter 184h of "green" associated with the eighth configurable light 130h.

Figure 1E:
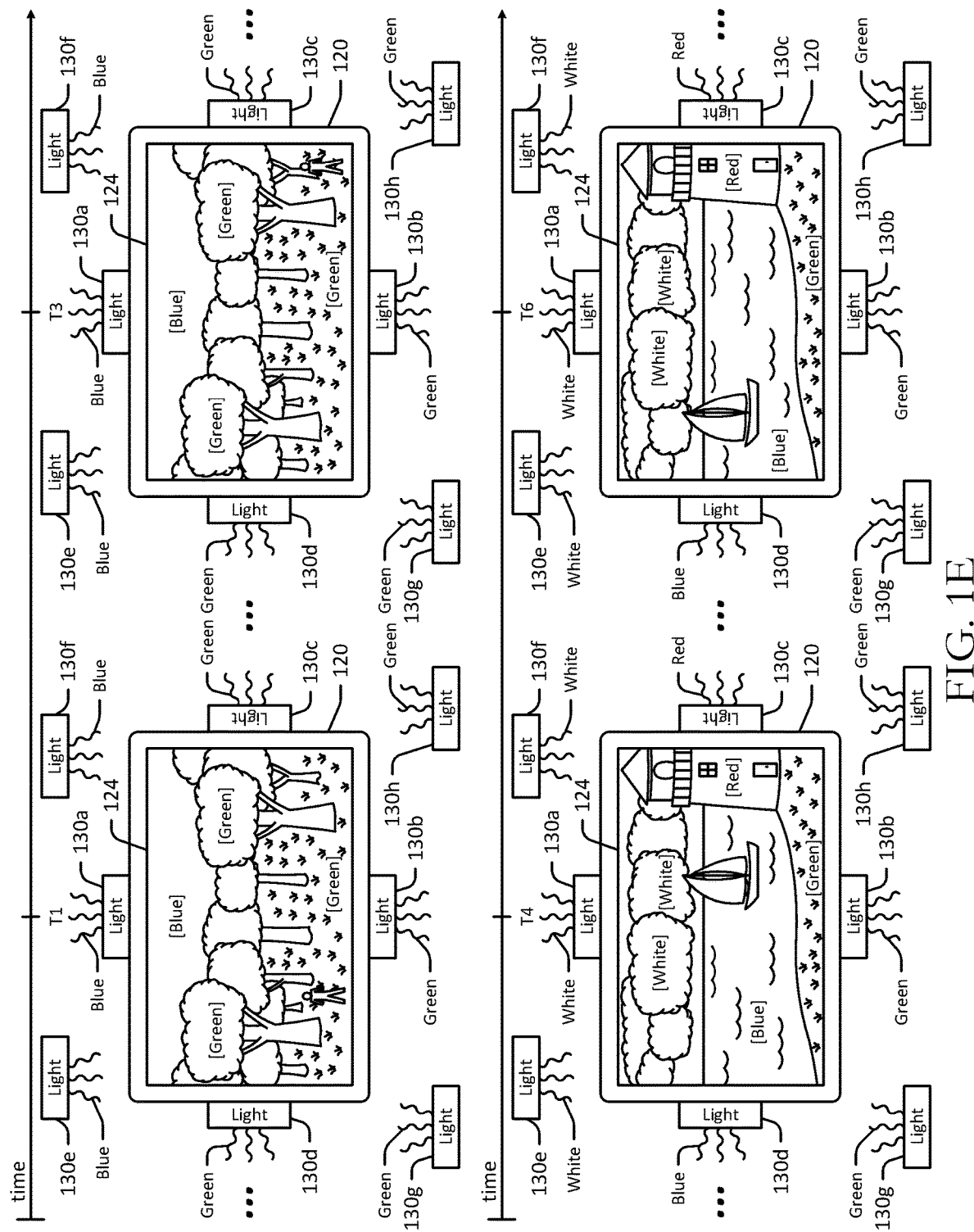
FIG. 1E is a system diagram illustrating controlling configurable lights using color metadata of a media stream in accordance with one or more embodiments of the disclosure.

FIG. 1E illustrates the configurable lights 130 outputting colors during the presentation of respective portions of the video content at the user device 120. As explained above, the user device 120 may send commands for the configurable lights 130 to output one or more colors during the presentation of respective portions of the video content. For example, the user device 120 may send a first command for the configurable lights 130 to output a first plurality of colors during the presentation of the first portion of the video content at the user device 120. According to the illustrated example, the first command may direct the configurable lights 130 to begin outputting the first plurality of colors at the first elapsed time T1 and to continue outputting the first plurality of colors through the third elapsed time T3. The first command may include the first set of lighting color parameters 182. In this manner, during the presentation of the first portion of the video content, the first configurable light 130a, the fifth configurable light 130e, and the sixth configurable light 130f may output blue light, and the second configurable light 130b, the third configurable light 130c, the fourth configurable light 130d, the seventh configurable light 130g, and the eighth configurable light 130h may output green light. The user device 120 subsequently may send a second command for the configurable lights 130 to output a second plurality of colors during the presentation of the second portion of the video content at the user device 120. According to the illustrated example, the second command may direct the configurable lights 130 to begin outputting the second plurality of colors at the fourth elapsed time T4 and to continue outputting the second plurality of colors through the sixth elapsed time T6. The second command may include the second set of lighting color parameters 184. In this manner, during the presentation of the second portion of the video content, the first configurable light 130a, the fifth configurable light 130e, and the sixth configurable light 130f may output white light, the second configurable light 130b, the seventh configurable light 130g, and the eighth configurable light 130h may output green light, the third configurable light 130c may output red light, and the fourth configurable light 130d may output blue light.

By implementing the process of sending a request for media content for presentation at a user device, receiving a media stream that includes in-band video content data and out-of-band color metadata from a media content server, determining, based at least in part on the color metadata, respective sets of lighting color parameters for configurable lights associated with an environment of the user device and corresponding to respective portions of the video content, causing a presentation of a portion of the video content at the user device, and sending, based at least in part on the respective set of lighting color parameters, a command for the configurable lights to output a plurality of colors during the presentation of the portion of the video content at the user device, embodiments of the disclosure may provide an enhanced viewing experience for users consuming streamed media content at a user device.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
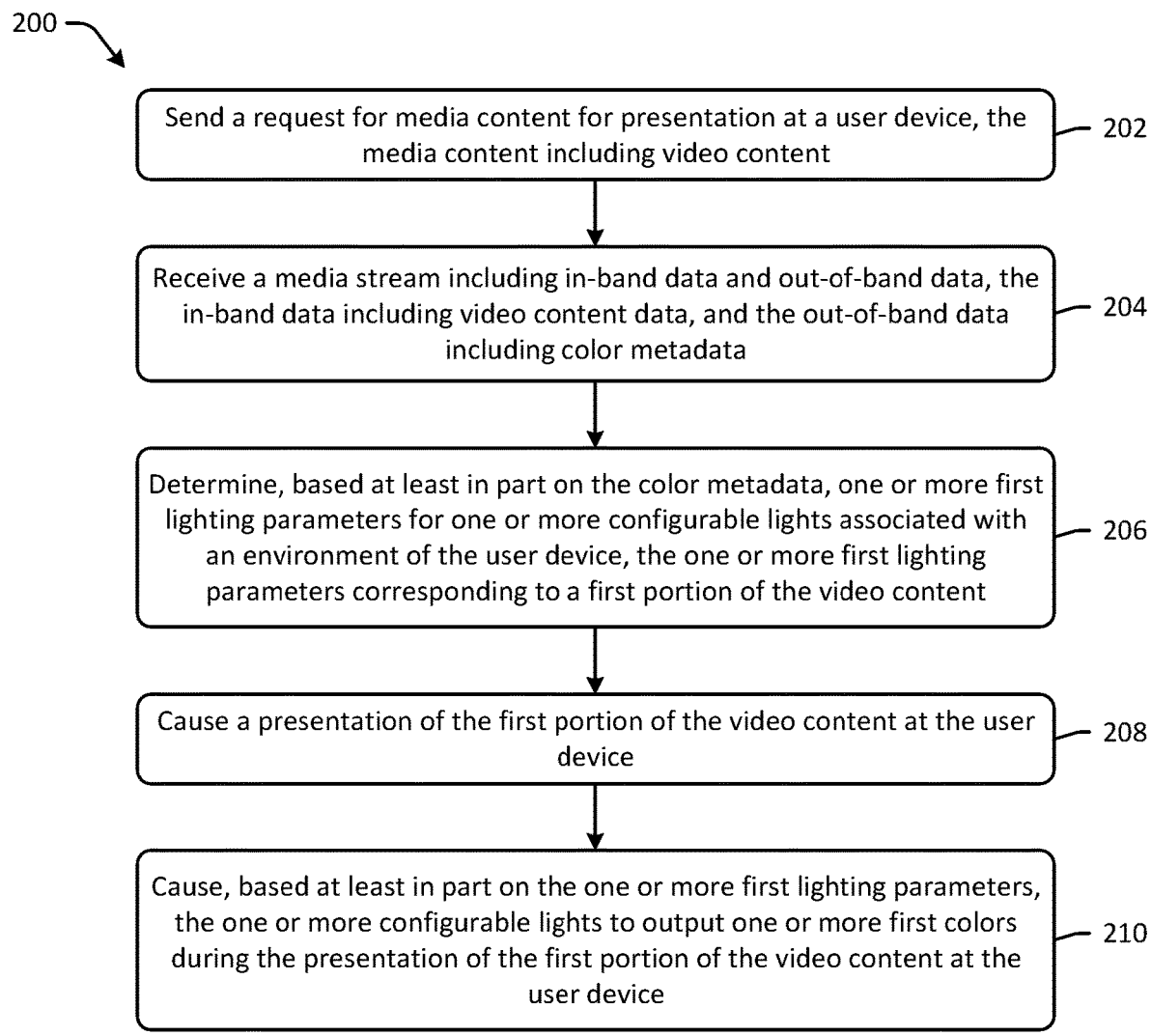
FIG. 2 is an example process flow diagram for controlling configurable lights using color metadata of a media stream in accordance with one or more embodiments of the disclosure.

Referring to FIG. 2, an example process flow 200 for controlling configurable lights using color metadata of a media stream in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a user device, such as the user device 120 described above.

At block 202 of the process flow 200, a request for media content for presentation at a user device may be sent. For example, computer-executable instructions of one or more media content module(s) stored at the user device may be executed to send a request for media content for presentation at the user device. The media content may include video content. In some embodiments, the media content may include, in addition to the video content, audio content. In some embodiments, the request for media content may be sent to a remote media content server, and the request may indicate that the media content is to be streamed to the user device.

At block 204 of the process flow 200, a media stream including in-band data and out-of-band data may be received. For example, computer-executable instructions of one or more media content module(s) stored at the user device may be executed to receive a media stream including in-band data and out-of-band data. The in-band data may include video content data, and the out-of-band data may include color metadata. In some embodiments, the in-band data may be encrypted (e.g., for example, in connection with digital rights management (DRM)), and the out-of-band data may be unencrypted. The media stream may be received from the media content server in response to the media content server receiving and processing the request for media content. In some embodiments, the color metadata may be generated by the media content server by analyzing respective image frames of the video content. In some embodiments, the color metadata may have been previously generated by a creator of the media content, and the media content server may retrieve the color metadata from a database accessible to the media content server. In some embodiments, the color metadata may include a plurality of entries corresponding to respective elapsed times of the media content. Each entry of the color metadata may include a time value corresponding to the respective elapsed time of the media content, and one or more color values associated with the time value. In some embodiments, the one or more color values may correspond to one or more colors depicted in one or more regions of the video content at the respective elapsed time of the media content.

At block 206 of the process flow 200, one or more first lighting parameters for one or more configurable lights associated with an environment of the user device may be determined based at least in part on the color metadata. For example, computer-executable instructions of one or more lighting control module(s) stored at the user device may be executed to determine, based at least in part on the color metadata, one or more first lighting parameters for one or more configurable lights associated with an environment of the user device. The one or more first lighting parameters may correspond to a first portion of the video content. In some embodiments, each lighting parameter of the one or more first lighting parameters may be indicative of a color to be output by the one or more configurable lights during a presentation of the first portion of the video content at the user device. In some embodiments, the one or more first lighting parameters may be determined based at least in part on the color metadata and the lighting setup associated with the configurable lights of the user environment. In some embodiments, the one or more first lighting parameters may be determined based at least in part on the color metadata and the user profile associated with the user device.

At block 208 of the process flow 200, a presentation of the first portion of the video content at the user device may be caused. For example, computer-executable instructions of one or more media content module(s) stored at the user device may be executed to cause a presentation of the first portion of the video content at the user device.

At block 210 of the process flow 200, the one or more configurable lights may be caused, based at least in part on the one or more first lighting parameters, to output one or more first colors during the presentation of the first portion of the video content at the user device. For example, computer-executable instructions of one or more lighting control module(s) stored at the user device may be executed to generate, based at least in part on the one or more first lighting parameters, a command for the one or more configurable lights to output one or more first colors during the presentation of the first portion of the first portion of the video content at the user device. In some embodiments, the user device may send a command for the one or more configurable lights to output the one or more first colors. In some embodiments, the command may be sent by the user device to an access point, routed by the access point to a lighting bridge, and relayed by the lighting bridge to the one or more configurable lights. In some embodiments, the command may be sent by the user device directly to the lighting bridge and relayed by the lighting bridge to the one or more configurable lights. In some embodiments, the command may be sent by the user device directly to the configurable lights. Upon receiving the command, the configurable lights may output the respective one or more colors during the presentation of the first portion of the video content at the user device.

Figure 3:
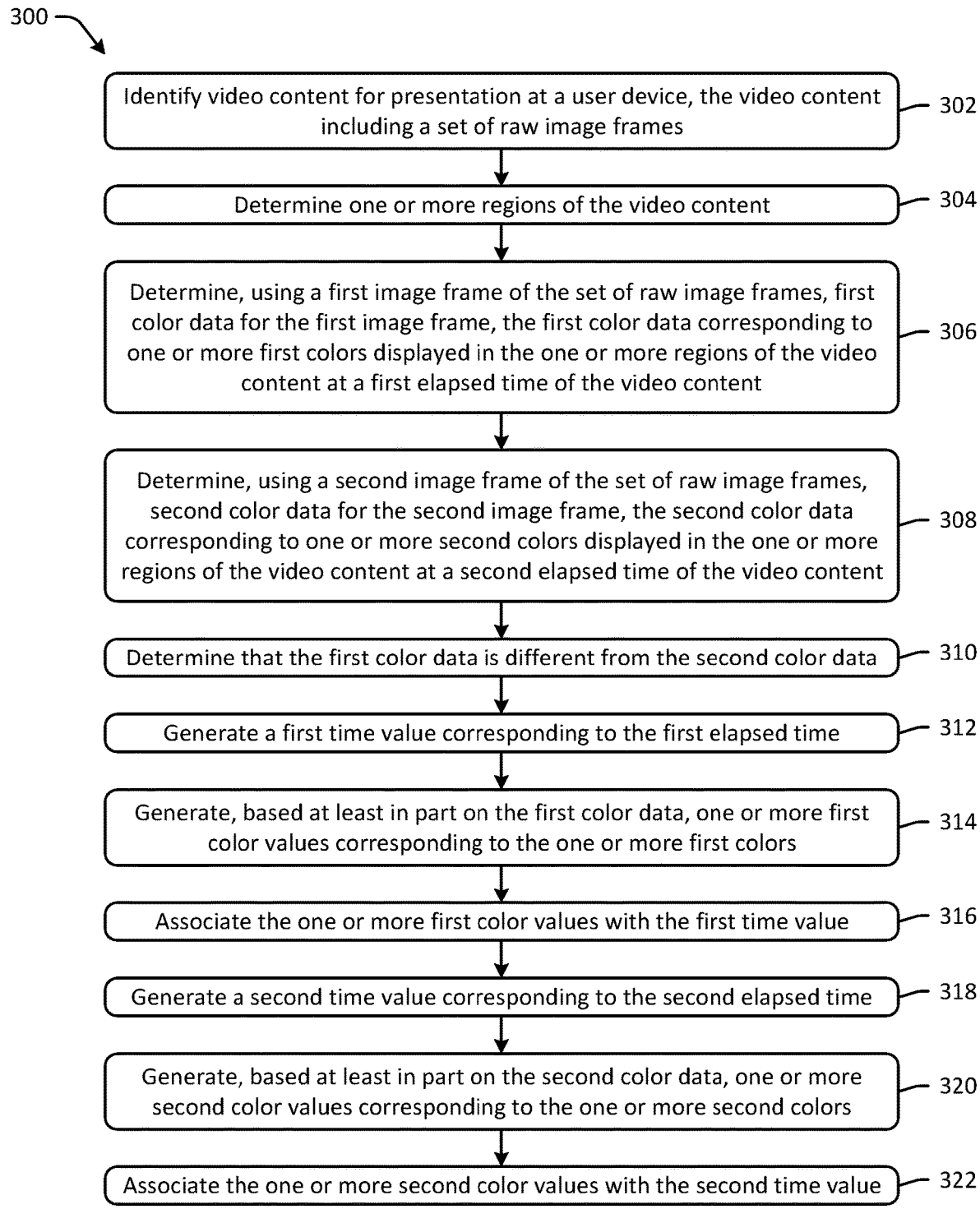
FIG. 3 is an example process flow diagram for generating color metadata of a media stream using image frames of video content in accordance with one or more embodiments of the disclosure.

FIG. 3 depicts an example process flow 300 for generating color metadata of a media stream using image frames of video content in accordance with one or more embodiments of the disclosure. Although certain operations are illustrated as occurring separately in FIG. 3, some or all of the operations may occur concurrently or partially concurrently across one or more computer systems. In some embodiments, the operations of the process flow 300 may be executed by a remote server, such as the media content server 110 described above.

At block 302 of the process flow 300, video content for presentation at a user device may be identified. For example, computer-executable instructions of one or more metadata generation module(s) stored at the server may be executed to identify video content for presentation at a user device. The video content may include a set of raw image frames. In some embodiments, the video content may include a plurality of image frames per second of the video content. For example, the video content may include twenty-four (24) image frames per second of the video content.

At block 304 of the process flow 300, one or more regions of the video content may be determined. For example, computer-executable instructions of one or more metadata generation module(s) stored at the server may be executed to determine one or more regions of the video content. In some embodiments, the video content may include a plurality of regions corresponding to respective portions of a display screen at which the video content may be presented. For example, the video content may include a first region corresponding to a top portion of a display screen, a second region corresponding to a bottom portion of a display screen, a third region corresponding to a right-side portion of a display screen, and a fourth region corresponding to a left-side region of a display screen. Any number of regions of the video content may be used. In some embodiments, a single region may be used, which may correspond to the entirety of a display screen or only a portion of the display screen.

At block 306 of the process flow 300, first color data for a first image frame of the set of raw image frames may be determined using the first image frame. For example, computer-executable instructions of one or more metadata generation module(s) stored at the server may be executed to determine, using a first image frame of the set of raw image frames, first color data for the first image frame. The first color data may correspond to one or more first colors displayed in the one or more regions of the video content at a first elapsed time of the video content.

At block 308 of the process flow 300, second color data for a second image frame of the set of raw image frames may be determined using the second image frame. For example, computer-executable instructions of one or more metadata generation module(s) stored at the server may be executed to determine, using a second image frame of the set of raw image frames, second color data for the second image frame. The second color data may correspond to one or more second colors displayed in the one or more regions of the video content at a second elapsed time of the video content.

At block 310 of the process flow 300, it may be determined that the first color data is different from the second color data. For example, computer-executable instructions of one or more metadata generation module(s) stored at the server may be executed to determine that the first color data is different from the second color data.

At block 312 of the process flow 300, a first time value corresponding to the first elapsed time may be generated. For example, computer-executable instructions of one or more metadata generation module(s) stored at the server may be executed to generate a first time value corresponding to the first elapsed time.

At block 314 of the process flow 300, one or more first color values corresponding to the one or more first colors may be generated based at least in part on the first color data. For example, computer-executable instructions of one or more metadata generation module(s) stored at the server may be executed to generate, based at least in part on the first color data, one or more first color values corresponding to the one or more first colors. For example, the first color data for the first image frame may be used to generate respective color values for the respective regions of the video content at the first elapsed time of the video content. In some embodiments, each color value may correspond to an average color of the one or more colors displayed within a particular region of the video content at the first elapsed time. In some embodiments, each color value may correspond to an average color of the one or more colors displayed within a particular region of the video content at the first elapsed time.

At block 316 of the process flow 300, the one or more first color values may be associated with the first time value. For example, computer-executable instructions of one or more metadata generation module(s) stored at the server may be executed to associate the one or more first color values with the first time value.

At block 318 of the process flow 300, a second time value corresponding to the second elapsed time may be generated. For example, computer-executable instructions of one or more metadata generation module(s) stored at the server may be executed to generate a second time value corresponding to the second elapsed time.

At block 320 of the process flow 300, one or more second color values corresponding to the one or more second colors may be generated based at least in part on the second color data. For example, computer-executable instructions of one or more metadata generation module(s) stored at the server may be executed to generate, based at least in part on the second color data, one or more second color values corresponding to the one or more second colors. For example, the second color data for the second image frame may be used to generate respective color values for the respective regions of the video content at the second elapsed time of the video content. In some embodiments, each color value may correspond to an average color of the one or more colors displayed within a particular region of the video content at the second elapsed time. In some embodiments, each color value may correspond to an average color of the one or more colors displayed within a particular region of the video content at the second elapsed time.

At block 322 of the process flow 300, the one or more second color values may be associated with the second time value. For example, computer-executable instructions of one or more metadata generation module(s) stored at the server may be executed to associate the one or more second color values with the second time value.

Figure 4A:
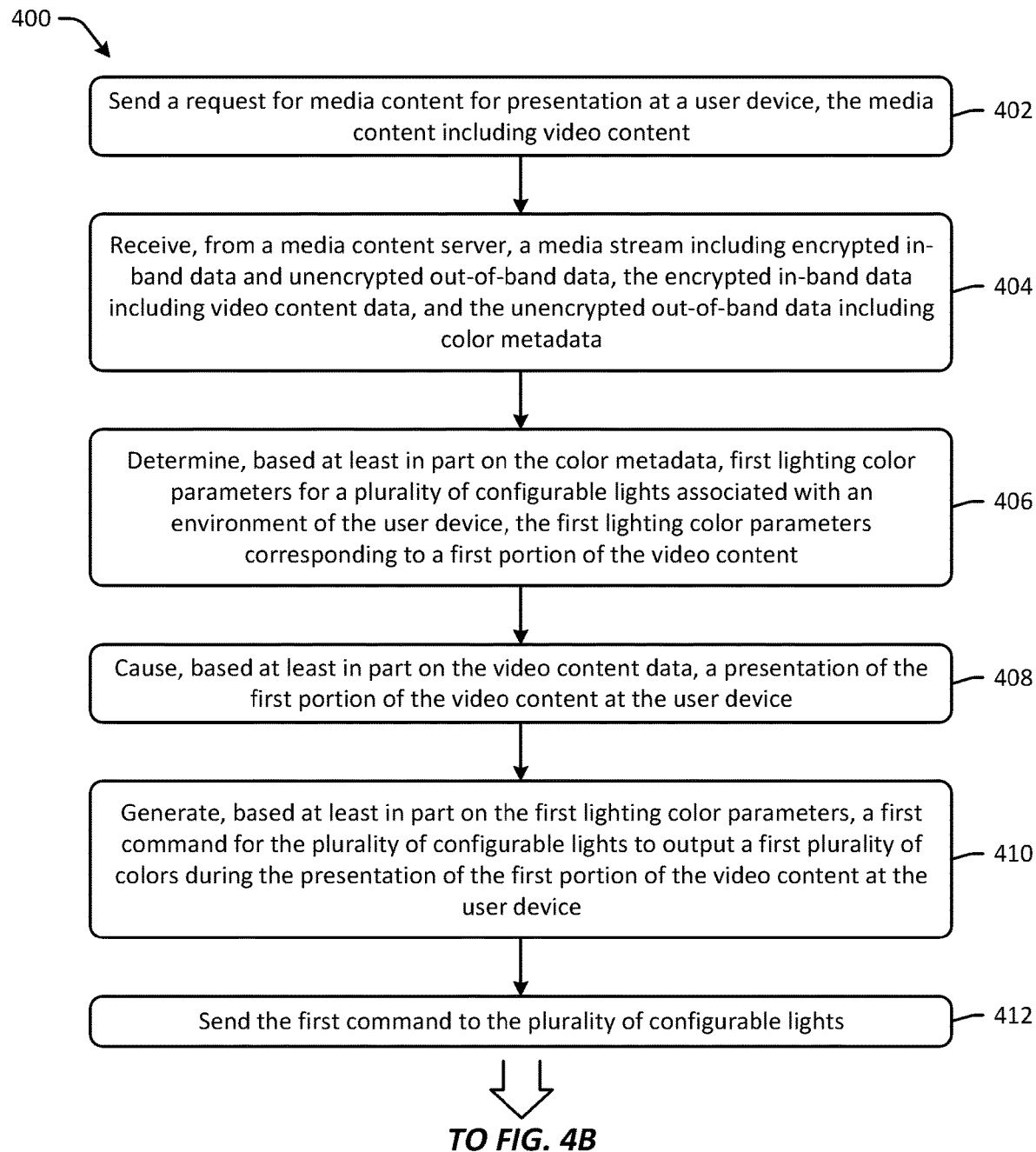
FIGS. 4A and 4B are an example process flow diagram for controlling configurable lights using color metadata of a media stream in accordance with one or more embodiments of the disclosure.
Figure 4B:
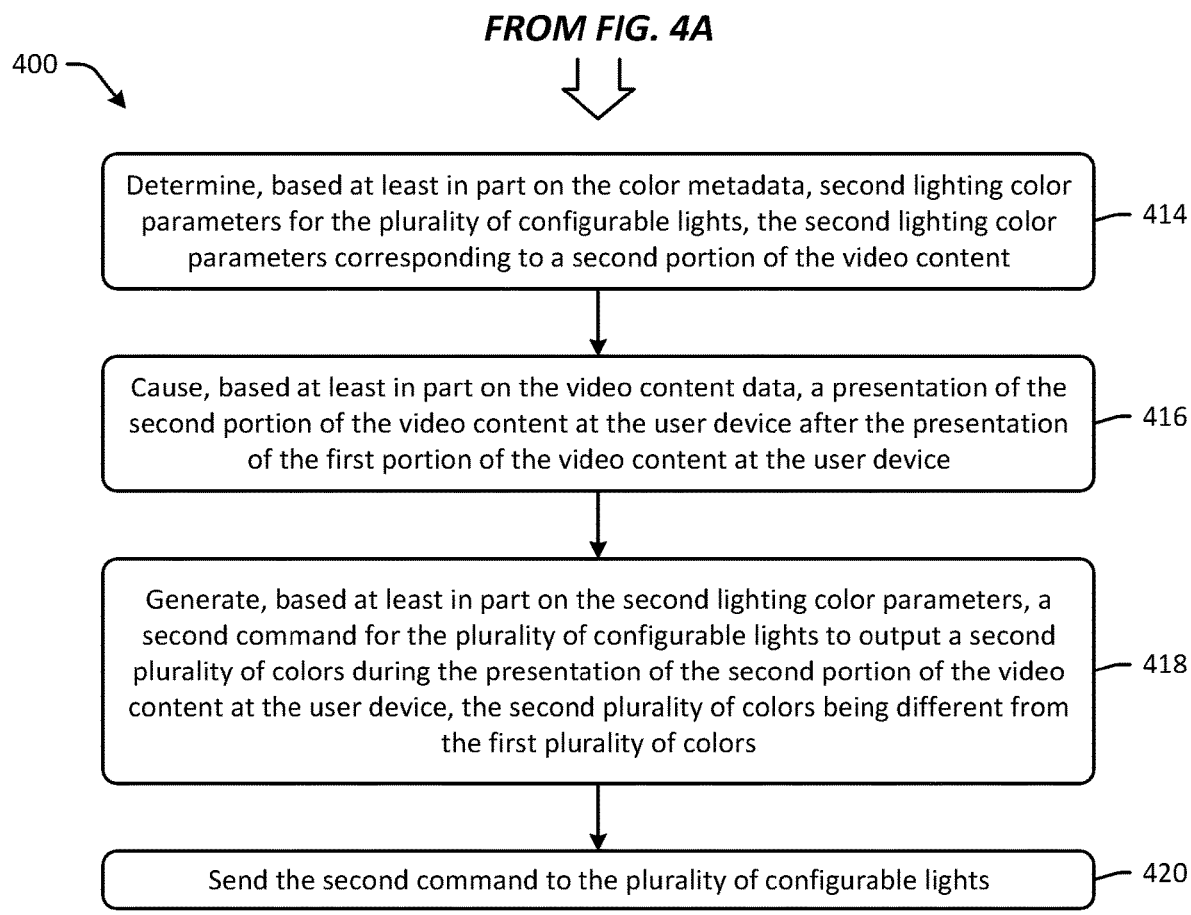

FIGS. 4A and 4B depict an example process flow 400 for controlling configurable lights using color metadata of a media stream in accordance with one or more embodiments of the disclosure. Although certain operations are illustrated as occurring separately in FIGS. 4A and 4B, some or all of the operations may occur concurrently or partially concurrently across one or more computer systems. In some embodiments, the operations of the process flow 400 may be executed by a user device, such as the user device 120 described above.

At block 402 of the process flow 400, a request for media content for presentation at a user device may be sent. For example, computer-executable instructions of one or more media content module(s) stored at the user device may be executed to send a request for media content for presentation at the user device. The media content may include video content. In some embodiments, the media content may include, in addition to the video content, audio content. In some embodiments, the request for media content may be sent to a remote media content server, and the request may indicate that the media content is to be streamed to the user device.

At block 404 of the process flow, a media stream including encrypted in-band data and unencrypted out-of-band data may be received from a media content server. For example, computer-executable instructions of one or more media content module(s) stored at the user device may be executed to receive, from a media content server, a media stream including encrypted in-band data and unencrypted out-of-band data. The encrypted in-band data may include video content data, and the unencrypted out-of-band data may include color metadata. The media stream may be received from the media content server in response to the media content server receiving and processing the request for media content. In some embodiments, the color metadata may be provided as text data, which may be sent to the user device as a single text file corresponding to the entirety of the media content or as a set of text files each corresponding to a respective portion of the media content. In some embodiments, the color metadata may be provided as pixel data, which may be sent to the user device as a single file corresponding to the entirety of the media content or as a set of files each corresponding to a respective portion of the media content. In some embodiments, the color metadata may be generated by the media content server by analyzing respective image frames of the video content. In some embodiments, the color metadata may have been previously generated by a creator of the media content, and the media content server may retrieve the color metadata from a database accessible to the media content server. In some embodiments, the color metadata may include a plurality of entries corresponding to respective elapsed times of the media content. Each entry of the color metadata may include a time value corresponding to the respective elapsed time of the media content, and one or more color values associated with the time value. In some embodiments, the one or more color values may correspond to one or more colors depicted in one or more regions of the video content at the respective elapsed time of the media content. In some embodiments, the one or more color values may correspond to one or more visual effects that complement a scene or action depicted in the video content at the respective elapsed time of the media content.

At block 406 of the process flow 400, first lighting color parameters for a plurality of configurable lights associated with an environment of the user device may be determined based at least in part on the color metadata. For example, computer-executable instructions of one or more lighting control module(s) stored at the user device may be executed to determine, based at least in part on the color metadata, first lighting color parameters for a plurality of configurable lights associated with an environment of the user device. The first lighting color parameters may correspond to a first portion of the video content. In some embodiments, each lighting color parameter of the first lighting color parameters may be indicative of a color to be output by one or more of the plurality of configurable lights during a presentation of the first portion of the video content at the user device. In some embodiments, the first lighting color parameters may be determined based at least in part on the color metadata and the lighting setup corresponding to the configuration of the plurality of configurable lights in the user environment. In some embodiments, the first lighting color parameters may be determined based at least in part on the color metadata and the user profile associated with the user device.

At block 408 of the process flow 400, a presentation of the first portion of the video content at the user device may be caused based at least in part on the video content data. For example, computer-executable instructions of one or more media content module(s) stored at the user device may be executed to cause, based at least in part on the video content data, a presentation of the first portion of the video content at the user device.

At block 410 of the process flow 400, a first command for the plurality of configurable lights to output a first plurality of colors during the presentation of the first portion of the video content at the user device may be generated based at least in part on the first lighting color parameters. For example, computer-executable instructions of one or more lighting control module(s) stored at the user device may be executed to generate, based at least in part on the first lighting color parameters and using one or more APIs, a first command for the plurality of configurable lights to output a first plurality of colors during the presentation of the first portion of the video content at the user device.

At block 412 of the process flow 400, the first command may be sent to the plurality of configurable lights. For example, computer-executable instructions of one or more lighting control module(s) stored at the user device may be executed to send the first command to the plurality of configurable lights. In some embodiments, the first command may be sent by the user device to an access point, routed by the access point to a lighting bridge, and relayed by the lighting bridge to the plurality of configurable lights. In some embodiments, the first command may be sent by the user device directly to the lighting bridge and relayed by the lighting bridge to the plurality of configurable lights. In some embodiments, the first command may be sent by the user device directly to the plurality of configurable lights. Upon receiving the first command, the plurality of configurable lights may output the first plurality of colors during the presentation of the first portion of the video content at the user device.

At block 414 of the process flow 400, second lighting color parameters for the plurality of configurable lights may be determined based at least in part on the color metadata. For example, computer-executable instructions of one or more lighting control module(s) stored at the user device may be executed to determine, based at least in part on the color metadata, second lighting color parameters for the plurality of configurable lights. The second lighting color parameters may correspond to a second portion of the video content. In some embodiments, each lighting color parameter of the second lighting color parameters may be indicative of a color to be output by one or more of the plurality of configurable lights during a presentation of the second portion of the video content at the user device. In some embodiments, the second lighting color parameters may be determined based at least in part on the color metadata and the lighting setup corresponding to the configuration of the plurality of configurable lights in the user environment. In some embodiments, the second lighting color parameters may be determined based at least in part on the color metadata and the user profile associated with the user device.

At block 416 of the process flow 400, a presentation of the second portion of the video content at the user device after the presentation of the first portion of the video content at the user device may be caused based at least in part on the video content data. For example, computer-executable instructions of one or more media content module(s) stored at the user device may be executed to cause, based at least in part on the video content data, a presentation of the second portion of the video content at the user device after the presentation of the first portion of the video content at the user device.

At block 418 of the process flow 400, a second command for the plurality of configurable lights to output a second plurality of colors during the presentation of the second portion of the video content at the user device may be generated based at least in part on the second lighting color parameters. For example, computer-executable instructions of one or more lighting control module(s) stored at the user device may be executed to generate, based at least in part on the second lighting color parameters and using one or more APIs, a second command for the plurality of configurable lights to output a second plurality of colors during the presentation of the second portion of the video content at the user device. The second plurality of colors may be different from the first plurality of colors.

At block 412 of the process flow 400, the first command may be sent to the plurality of configurable lights. For example, computer-executable instructions of one or more lighting control module(s) stored at the user device may be executed to send the first command to the plurality of configurable lights. In some embodiments, the second command may be sent by the user device to an access point, routed by the access point to a lighting bridge, and relayed by the lighting bridge to the plurality of configurable lights. In some embodiments, the second command may be sent by the user device directly to the lighting bridge and relayed by the lighting bridge to the plurality of configurable lights. In some embodiments, the second command may be sent by the user device directly to the plurality of configurable lights. Upon receiving the second command, the plurality of configurable lights may output the second plurality of colors during the presentation of the second portion of the video content at the user device.

Illustrative Computer Architecture

Figure 5:
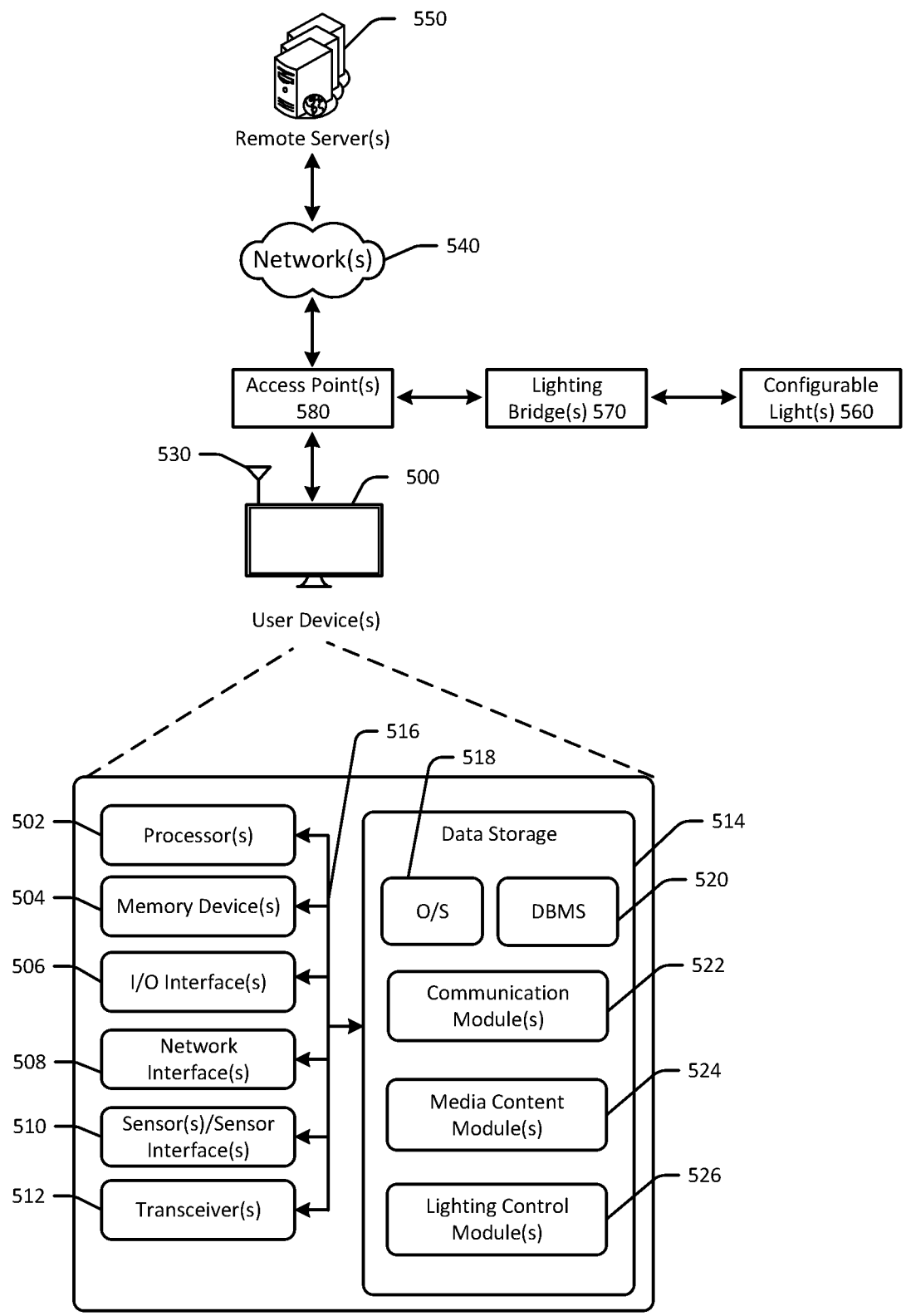
FIG. 5 schematically illustrates an example architecture of a system in accordance with one or more embodiments of the disclosure.

FIG. 5 is a schematic block diagram of one or more illustrative user device(s) 500 in accordance with one or more example embodiments of the disclosure. The user device(s) 500 may include any suitable computing device including, but not limited to, a server system, a mobile device such as a smartphone, a tablet, an e-reader, a wearable device, or the like; a desktop computer; a laptop computer; a content streaming device; a set-top box; a television; or the like or combinations thereof. The user device(s) 500 may correspond to an illustrative device configuration for the user device(s) of FIGS. 1-4B.

The user device(s) 500 may be configured to communicate via one or more networks with one or more servers, user devices, or the like. The user device(s) 500 may be configured to deliver or cause delivery and receive or cause receipt of instructions and/or one or more pieces of content and may further be configured to send a request for media content for presentation at the user device, receive a media stream that includes in-band video content data and out-of-band color metadata, determine, based at least in part on the color metadata, respective sets of lighting color parameters for configurable lights associated with an environment of the user device, cause a presentation of a portion of the video content at the user device, and cause, based at least in part on the respective set of lighting parameters, the configurable lights to output one or more colors during the presentation of the portion of the video content at the user device.

The user device(s) 500 may be configured to communicate via one or more network(s) 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the user device(s) 500 may communicate with one or more remote server(s) 550 via the network(s) 540. The user device(s) 500 also may communicate with one or more configurable light(s) 560 associated with an environment of the user device(s) 500. Communication between the user device(s) 500 and the configurable light(s) 560 may be facilitated by the one or more lighting bridge(s) 570 and one or more access point(s) 580. For example, commands or control signals may be delivered from the user device(s) 500 to the access point(s) 580, routed by the access point(s) 580 to the lighting bridge(s) 570, and relayed by the lighting bridge(s) 570 to the configurable light(s) 560. Alternatively, commands or control signals may be delivered from the user device(s) 500 directly to the lighting bridge(s) 570 and relayed by the lighting bridge(s) 570 to the configurable light(s) 560 or delivered from the user device(s) 500 directly to the configurable light(s) 560.

In an illustrative configuration, the user device(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The user device(s) 500 may further include one or more buses 516 that functionally couple various components of the user device(s) 500. The user device(s) 500 may further include one or more antenna (e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the user device(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the user device(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522, one or more media content module(s) 524, and/or one or more lighting control module(s) 526. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the user device(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, media content information, video content information, audio content information, color metadata information, lighting setup information, user profile information, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the user device(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The media content module(s) 524 may include computer-executable instructions, code, or the like that responsive to execution by one or more of the processor(s) 502 may perform functions including, but not limited to, sending a request for media content for presentation at the user device, receiving a media stream including in-band data and outof-band data, causing a presentation of video content at the user device, and causing an output of audio content at the user device.

The lighting control module(s) 526 may include computer-executable instructions, code, or the like that responsive to execution by one or more of the processor(s) 502 may perform functions including, but not limited to, receiving and processing color metadata, determining, based at least in part on the color metadata, lighting color parameters for configurable lights associated with an environment of the user device, generating a command for the configurable lights to output colors during a presentation of video content at the user device, and sending the command to the configurable lights.

Referring now to other illustrative components depicted as being stored in the data storage 514, the O/S 518 may be loaded from the data storage 514 into the memory 504 and may provide an interface between other application software executing on the user device(s) 500 and the hardware resources of the user device(s) 500. More specifically, the O/S 518 may include a set of computer-executable instructions for managing the hardware resources of the user device(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the user device(s) 500 is a mobile device, the DBMS 520 may be any suitable light-weight DBMS optimized for performance on a mobile device.

Referring now to other illustrative components of the user device(s) 500, the input/output (I/O) interface(s) 506 may facilitate the receipt of input information by the user device(s) 500 from one or more I/O devices as well as the output of information from the user device(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the user device(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The user device(s) 500 may further include one or more network interface(s) 508 via which the user device(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna(e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceiver(s) 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the user device(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the user device(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the user device(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the user device(s) 500 may include alternate and/or additional hardware, software, or firmware components beyond those described or depicted without departing from the scope of the disclosure. More particularly, it should be appreciated that software, firmware, or hardware components depicted as forming part of the user device(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

One or more operations of the method, process flows, or use cases of FIGS. 1-4B may have been described above as being performed by a user device, or more specifically, by one or more program module(s), applications, or the like executing on a device. It should be appreciated, however, that any of the operations of methods, process flows, or use cases of FIGS. 1-4B may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4B may be described in the context of the illustrative devices, it should be appreciated that such operations may be implemented in connection with numerous other device configurations.

The operations described and depicted in the illustrative methods, process flows, and use cases of FIGS. 1-4B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
    sending, by one or more computer processors coupled to at least one memory, a request for media content for presentation at a user device, the media content comprising video content;
    receiving, from a media content server, a media stream comprising encrypted in-band data and unencrypted out-of-band data, the encrypted in-band data comprising video content data, and the unencrypted out-of-band data comprising color metadata;
    determining, based at least in part on the color metadata, first lighting color parameters for a plurality of configurable lights associated with an environment of the user device, the first lighting color parameters corresponding to a first portion of the video content;
    causing, based at least in part on the video content data, a presentation of the first portion of the video content at the user device;
    sending, based at least in part on the first lighting color parameters, a first command for the plurality of configurable lights to output a first plurality of colors during the presentation of the first portion of the video content at the user device;
    determining, based at least in part on the color metadata, second lighting color parameters for the plurality of configurable lights, the second lighting color parameters corresponding to a second portion of the video content;
    causing, based at least in part on the video content data, a presentation of the second portion of the video content at the user device after the presentation of the first portion of the video content at the user device; and
    sending, based at least in part on the second lighting color parameters, a second command for the plurality of configurable lights to output a second plurality of colors during the presentation of the second portion of the video content at the user device, the second plurality of colors being different from the first plurality of colors.

2. The method of claim 1, wherein the color metadata comprises:
    a first time value corresponding to a first elapsed time of the video content, the first elapsed time corresponding to a beginning of the first portion of the video content;
    a first color value associated with the first time value and corresponding to a first region of the video content at the first elapsed time;
    a second color value associated with the first time value and corresponding to a second region of the video content at the first elapsed time;
    a second time value corresponding to a second elapsed time of the video content, the second elapsed time corresponding to a beginning of the second portion of the video content;
    a third color value associated with the second time value and corresponding to the first region of the video content at the second elapsed time; and
    a fourth color value associated with the second time value and corresponding to the second region of the video content at the second elapsed time.

3. The method of claim 2, wherein the plurality of configurable lights comprises a first configurable light and a second configurable light;
    wherein determining the first lighting color parameters for the plurality of configurable lights comprises:
        determining, based at least in part on the first color value, a first color parameter associated with the first configurable light, the first color parameter indicative of a first color to be output by the first configurable light during the presentation of the first portion of the video content at the user device; and
        determining, based at least in part on the second color value, a second color parameter associated with the second configurable light, the second color parameter indicative of a second color to be output by the second configurable light during the presentation of the first portion of the video content at the user device; and
    wherein determining the second lighting color parameters for the plurality of configurable lights comprises:
        determining, based at least in part on the third color value, a third color parameter associated with the first configurable light, the third color parameter indicative of a third color to be output by the first configurable light during the presentation of the second portion of the video content at the user device; and
        determining, based at least in part on the fourth color value, a fourth color parameter associated with the second configurable light, the fourth color parameter indicative of a fourth color to be output by the second configurable light during the presentation of the second portion of the video content at the user device.

4. The method of claim 3, wherein the first command comprises the first color parameter and the second color parameter, and wherein sending the first command for the plurality of configurable lights to output the first plurality of colors during the presentation of the first portion of the video content at the user device comprises:
    sending the first command to the plurality of configurable lights via an access point and a lighting bridge, wherein the first command is sent by the user device to the access point, routed by the access point to the lighting bridge, and relayed by the lighting bridge to the plurality of configurable lights;
    sending the first command to the plurality of configurable lights via the lighting bridge, wherein the first command is sent by the user device to the lighting bridge and relayed by the lighting bridge to the plurality of configurable lights; or sending the first command by the user device to the plurality of configurable lights.

5. A method comprising:

sending, by one or more computer processors coupled to at least one memory, a request for media content for presentation at a user device, the media content comprising video content;

receiving a media stream comprising in-band data and out-of-band data, the in-band data comprising video content data, and the out-of-band data comprising color metadata;

determining, based at least in part on the color metadata, one or more first lighting parameters for one or more configurable lights associated with an environment of the user device, the one or more first lighting parameters corresponding to a first portion of the video content;

causing a presentation of the first portion of the video content at the user device; and causing, based at least in part on the one or more first lighting parameters, the one or more configurable lights to output one or more first colors during the presentation of the first portion of the video content at the user device.

6. The method of claim 5, wherein the in-band data is encrypted, and wherein the out-of-band data is unencrypted.

7. The method of claim 5, wherein the color metadata comprises:

a first time value corresponding to a first elapsed time of the media content, the first elapsed time corresponding to a beginning of the first portion of the video content; and one or more color values associated with the first time value and corresponding to one or more regions of the video content at the first elapsed time.

8. The method of claim 7, wherein determining the one or more first lighting parameters for the one or more configurable lights comprises determining the one or more first lighting parameters based at least in part on the one or more color values, and wherein the one or more first lighting parameters are indicative of the one or more first colors to be output by the one or more configurable lights during the presentation of the first portion of the video content at the user device.

9. The method of claim 5, further comprising:

determining, based at least in part on the color metadata, one or more second lighting parameters for the one or more configurable lights, the one or more second lighting parameters corresponding to a second portion of the video content;

causing a presentation of the second portion of the video content at the user device after the presentation of the first portion of the video content at the user device; and causing, based at least in part on the one or more second lighting parameters, the one or more configurable lights to output one or more second colors during the presentation of the second portion of the video content at the user device, the one or more second colors being different from the one or more second colors.

10. The method of claim 9, wherein the color metadata comprises:

a first time value corresponding to a first elapsed time of the media content, the first elapsed time corresponding to a beginning of the first portion of the video content;

one or more first color values associated with the first time value and corresponding to one or more regions of the video content at the first elapsed time;

a second time value corresponding to a second elapsed time of the media content, the second elapsed time corresponding to a beginning of the second portion of the video content; and one or more second color values associated with the second time value and corresponding to the one or more regions of the video content at the second elapsed time.

11. The method of claim 10, wherein the one or more configurable lights comprises a first configurable light and a second configurable light;

wherein determining the one or more first lighting parameters for the one or more configurable lights comprises:

determining, based at least in part on the one or more first color values, a first color parameter associated with the first configurable light, the first color parameter indicative of a first color to be output by the first configurable light during the presentation of the first portion of the video content at the user device; and determining, based at least in part on the one or more first color values, a second color parameter associated with the second configurable light, the second color parameter indicative of a second color to be output by the second configurable light during the presentation of the first portion of the video content at the user device; and wherein determining the one or more second lighting parameters for the one or more configurable lights comprises:

determining, based at least in part on the one or more second color values, a third color parameter associated with the first configurable light, the third color parameter indicative of a third color to be output by the first configurable light during the presentation of the second portion of the video content at the user device; and determining, based at least in part on the one or more second color values, a fourth color parameter associated with the second configurable light, the fourth color parameter indicative of a fourth color to be output by the second configurable light during the presentation of the second portion of the video content at the user device.

12. The method of claim 5, wherein causing the one or more configurable lights to output the one or more first colors during the presentation of the first portion of the video content at the user device comprises sending a command to the one or more configurable lights via an access point and a bridge, wherein the command comprises the one or more first lighting parameters, and wherein the command is sent by the user device to the access point, routed by the access point to the bridge, and relayed by the bridge to the one or more configurable lights.

13. The method of claim 5, wherein causing the one or more configurable lights to output the one or more first colors during the presentation of the first portion of the video content at the user device comprises sending a command to the one or more configurable lights via a bridge, wherein the command comprises the one or more first lighting parameters, and wherein the command is sent by the user device to the bridge and relayed by the bridge to the one or more configurable lights.

14. The method of claim 5, wherein causing the one or more configurable lights to output the one or more first colors during the presentation of the first portion of the video content at the user device comprises sending a command to the one or more configurable lights, wherein the command comprises the one or more first lighting parameters, and wherein the command is sent by the user device to the one or more configurable lights.

15. The method of claim 5, wherein the media content further comprises audio content, and wherein the in-band data further comprises audio content data, the method further comprising:
   determining, based at least in part on the color metadata, one or more second lighting parameters for the one or more configurable lights, the one or more second lighting parameters corresponding to a first portion of the audio content;
   causing an output of the first portion of the audio content at the user device; and
   causing, based at least in part on the one or more second lighting parameters, the one or more configurable lights to output one or more second colors during the output of the first portion of the audio content at the user device.

16. The method of claim 15, wherein the color metadata comprises:
   a first time value corresponding to a first elapsed time of the media content, the first elapsed time corresponding to a beginning of the first portion of the video content;
   one or more first color values associated with the first time value and corresponding to one or more regions of the video content at the first elapsed time;
   a second time value corresponding to a second elapsed time of the media content, the second elapsed time corresponding to a beginning of the first portion of the audio content; and
   one or more second color values associated with the second time value and corresponding to one or more auditory aspects of the audio content at the second elapsed time.

17. A device comprising:
   at least one memory that stores computer-executable instructions;
   at least one processor configured to access the at least one memory and execute the computer-executable instructions to:
      send a request for media content for presentation at the device, the media content comprising video content;
      receive a media stream comprising in-band data and out-of-band data, the in-band data comprising video content data, and the out-of-band data comprising color metadata;
      determine, based at least in part on the color metadata, one or more first lighting parameters for one or more configurable lights associated with an environment of the device, the one or more first lighting parameters corresponding to a first portion of the video content;
      cause a presentation of the first portion of the video content at the device; and
      cause, based at least in part on the one or more first lighting parameters, the one or more configurable lights to output one or more first colors during the presentation of the first portion of the video content at the device.

18. The device of claim 17, wherein the in-band data is encrypted, wherein the out-of-band data is unencrypted, and wherein the color metadata comprises:
   a first time value corresponding to a first elapsed time of the media content, the first elapsed time corresponding to a beginning of the first portion of the video content; and
   one or more color values associated with the first time value and corresponding to one or more regions of the video content at the first elapsed time.

19. The device of claim 17, wherein the at least one processor is further configured to access the at least one memory and execute the computer-executable instructions to:
   determine, based at least in part on the color metadata, one or more second lighting parameters for the one or more configurable lights, the one or more second lighting parameters corresponding to a second portion of the video content;
   cause a presentation of the second portion of the video content at the device after the presentation of the first portion of the video content at the device; and
   cause, based at least in part on the one or more second lighting parameters, the one or more configurable lights to output one or more second colors during the presentation of the second portion of the video content at the device, the one or more second colors being different from the one or more second colors; and
   wherein the color metadata comprises:
      a first time value corresponding to a first elapsed time of the media content, the first elapsed time corresponding to a beginning of the first portion of the video content;
      one or more first color values associated with the first time value and corresponding to one or more regions of the video content at the first elapsed time;
      a second time value corresponding to a second elapsed time of the media content, the second elapsed time corresponding to a beginning of the second portion of the video content; and
      one or more second color values associated with the second time value and corresponding to the one or more regions of the video content at the second elapsed time.

20. The device of claim 17, wherein the media content further comprises audio content, wherein the in-band data further comprises audio content data, and wherein the at least one processor is further configured to access the at least one memory and execute the computer-executable instructions to:
   determine, based at least in part on the color metadata, one or more second lighting parameters for the one or more configurable lights, the one or more second lighting parameters corresponding to a first portion of the audio content;
   cause an output of the first portion of the audio content at the device; and
   cause, based at least in part on the one or more second lighting parameters, the one or more configurable lights to output one or more second colors during the output of the first portion of the audio content at the device;
   wherein the color metadata comprises:
      a first time value corresponding to a first elapsed time of the media content, the first elapsed time corresponding to a beginning of the first portion of the video content;
      one or more first color values associated with the first time value and corresponding to one or more regions of the video content at the first elapsed time;

a second time value corresponding to a second elapsed time of the media content, the second elapsed time corresponding to a beginning of the first portion of the audio content; and one or more second color values associated with the second time value and corresponding to one or more auditory aspects of the audio content at the second elapsed time.

\* \* \* \* \*